US007861584B2

US007861584B2

(12) United States Patent
Korolev

(10) Patent No.: US 7,861,584 B2
(45) Date of Patent: Jan. 4, 2011

(54) PROBE TIPS FOR AIRBORNE INSTRUMENTS USED TO MEASURE CLOUD MICROPHYSICAL PARAMETERS

(75) Inventor: Alexei Korolev, Ontario (CA)

(73) Assignee: Her Majesty the Queen in right of Canada, as represented by the Minister of Environment (CA)

( * ) Notice: Subject to any disclaimer, the term of this patent is extended or adjusted under 35 U.S.C. 154(b) by 94 days.

(21) Appl. No.: 12/415,314

(22) Filed: Mar. 31, 2009

(65) Prior Publication Data

US 2010/0242588 A1    Sep. 30, 2010

(51) Int. Cl.
*G01W 1/00* (2006.01)
(52) U.S. Cl. .................................... 73/170.16
(58) Field of Classification Search ............ None
See application file for complete search history.

(56) References Cited

U.S. PATENT DOCUMENTS 3,057,198 A * 10/1962 Crouchman .............. 73/170.26

OTHER PUBLICATIONS

Gayet et al.; The Reliability of the PMS FSSP in the Presence of Small Crystals; Journal of Atmospheric and Oceanic Technology, vol. 13, 1996, pp. 1300-1310.
Gardiner et al.; Degradation of In-Cloud Forward Scattering Spectrometer Probe Measurements in the Presence of Ice Particles; vol. 2, Jun. 1985, Journal of Atmospheric and Oceanic Technology, pp. 171-180.
Field et al.; Shattering and Particle Interarrival Times Measured by Optical Array Probes in Ice Clouds, vol. 23, Oct. 2006, Journal of Atmospheric and Oceanic Technology, pp. 1357-1371.
Field et al.; Ice Particle Interarrival Times Measured With a Fast FSSP; vol. 20, Feb. 2003, Journal of Atmospheric and Oceanic Technology, pp. 249-261.
Korolev et al.; Shattering During Sampling by OAPs and HVPS. Part I: Snow Particles; vol. 22, May 2005, Journal of Atmospheric and Oceanic Technology; pp. 528-543.
Lawson et al.; Improvement in Determination of Ice Water Content From Two-Dimensional Particle Imagery. Part II: Applications to Collected Data; vol. 45, Journal of Atmospheric and Oceanic Technology, Sep. 2006, pp. 1291-1303.
Mertes et al.; Counterflow Virtual Impactor Based Collection of Small Ice Particles in Mixed-phase Clouds for the Physico-Chemical Characterization of Tropospheric Ice Nuclei; Sampler Description and First Case Study; Aerosol Science and Technology 2007, pp. 848-866.

* cited by examiner

*Primary Examiner*—Andre J Allen
(74) *Attorney, Agent, or Firm*—Schmeiser, Olsen & Watts, LLP

(57) ABSTRACT

An instrument for obtaining airborne measurements of cloud microphysical parameters. The instrument comprises supporting arms mounted thereon, optics and a detector for measuring the cloud microphysical parameters The supporting arms define an optical path of the instrument and comprise probe tips affixed thereto. The probe tips comprise an outer portion for deflecting particles away from the optical path of the instrument and an inner portion opposite the outer portion. The outer portion of the tips have a pyramidal section with a centre ridgeline and flat or concave surfaces effective to reduce water shedding and particle shattering during in-flight collection of data.

20 Claims, 14 Drawing Sheets

A

B

PROBE TIPS FOR AIRBORNE INSTRUMENTS USED TO MEASURE CLOUD MICROPHYSICAL PARAMETERS

FIELD OF INVENTION

The present invention relates to airborne instrumentation used for measuring cloud microphysical parameters. In particular, the present invention relates to probe tips for use with airborne instruments.

BACKGROUND OF THE INVENTION

The existence of small ice particles has remained a highly debatable issue in the cloud physics community. The first measurements of ice cloud particle sizes were obtained in the 1930's with the help of airborne impactors, yet almost eighty years later, researchers have yet to establish a consensus on whether observations of small ice particles with diameters <100 μm represent naturally occurring ice particles, or are the result of shattering of larger ice particles with the measuring probe's arms.

The presence of small ice particles may play a crucial role in the conversion of water vapor into precipitation. Furthermore, this may significantly affect radiation transfer in clouds and eventually affect the radiation budget of the Earth. Currently, small ice particles are included in many weather prediction and climate models, despite the fact that their natural occurrence has not yet been fully demonstrated.

The majority of airborne probes that are designed to measure cloud particles sizes use a laser-based measurement method, e.g. as illustrated in FIGS. 1A and B. The laser is shone between two supporting arms 1 which point into the air stream. As cloud particles with diameters from sub-micron to several centimeters cross through the laser beam 2, the laser light is blocked or scattered (depending on the instrument) by the cloud particles. Changes to the laser beam can be measured by various types of detectors from which the shapes, sizes and concentrations of the cloud particles can be determined. Existing technology uses semi-spherical or rounded arm tips 3 for the particle measurement probes. As shown for example in FIG. 1A, the semi-spherical tips generate large amounts of shattered, splashed and/or bounced particle fragments that are deflected into the sample volume of the probes.

It has been assumed for many years that cloud particles that shattered, splashed or bounced off of the protruding measurement arms, and which subsequently passed through the laser beam, would have an insignificant effect on the measurements of the cloud particle sizes and concentrations. This assumption is no longer deemed to be correct, and significant effort has been made to understand this phenomenon. Data processing methods to correct for the distortions in the natural cloud particle spectra caused by the particle shattering have been developed (Korolev et al., Journal of Atmospheric and Oceanic Technology, 2005, 22:528-542; Lawson et al., Journal of Applied Meteorology and Climatology, 2006, 45:1291-1303) and alternate methods of data collection using non-airborne instrumentation have also been pursued (Mertes et al., Aerosol Science and Technology, 2007, 41:848-864).

Despite these efforts, there continues to be a need for improved ice cloud particle measuring instrumentation that reduces the cloud particle shattering effect previously seen in cloud particle spectra.

SUMMARY OF THE INVENTION

It is therefore an object of the invention to provide improved airborne instrumentation used for measuring cloud microphysical parameters.

The invention relates to modified probe tips having an asymmetric shape to minimize both the surface area and length of edges which, upon impact, deflect particles towards the sample volume of the probe. The outer part of the tips consists of a pyramidal section having either flat or concave surfaces in order to minimize water shedding from the outer part of the tip towards the inner part and to prevent water from getting into the optical widows.

The invention further relates to an area of the probe arm in front of the optical window having a trap for water shedding along the arm surface, to prevent this water from entering the optical window. The water trap may comprise a narrow groove that expands towards its edges. The purpose of this expansion is to generate the air suction inside the groove to channel the shedding water away from the optical window.

There is accordingly provided herein an instrument for obtaining airborne measurements of cloud microphysical parameters. The instrument comprises supporting arms mounted thereon, optics and a detector for measuring the cloud microphysical parameters. The supporting arms define an optical path of the instrument. The instrument further comprises tips affixed to the supporting arms having an outer portion for deflecting particles away from the optical path of the instrument and an inner portion opposite the outer portion, The outer portion of the tips comprise a pyramidal section having a centre ridgeline and flat or concave surfaces effective to reduce water shedding from the outer portion of the tip towards the inner portion.

Also provided herein is a probe tip for airborne instruments used to measure cloud microphysical parameters. The probe tip has an outer portion for deflecting particles away from an optical path of the instrument, and an inner portion opposite the outer portion. The outer portion of the tip comprises a pyramidal section having a centre ridgeline and flat or concave surfaces effective to reduce water shedding from the outer portion of the tip towards the inner portion.

There is also provided a method of reducing particle shattering during collection of airborne measurements of cloud microphysical parameters. The method comprises steps of:

providing an airborne cloud particle measuring instrument with supporting arms mounted onto the instrument, optics and a detector for measuring the cloud microphysical parameters, the supporting arms defining an optical path of the instrument;

providing tips for the supporting arms having an outer portion for deflecting particles away from the optical path of the instrument and an inner portion opposite the outer portion, the outer portion of the tips comprising a pyramidal section having a centre ridgeline and flat or concave surfaces effective to reduce water shedding from the outer portion of the tip towards the inner portion; and collecting measurements in flight of cloud microphysical parameters using said airborne cloud particle measuring instrument, wherein the particle shattering observed in the collected measurements is reduced.

In an embodiment of the above instrument and method, the optics are laser-based optics. As an example, the instrument may be an OAP-2DC, OAP-2DP, HVPS, CIP, FSSP, CPI, CAPS and SID-type airborne cloud particle instrument.

In further embodiments, the supporting arms each comprise an optical window through which light from the optics of the instrument passes along said optical path. The supporting arms may optionally include a water trap to prevent water shed along the arm surface from entering the optical window. In such embodiments, the water trap may preferably form a narrow groove forward of the optical window that expands towards its edges to channel the shedding water away from the optical window.

According to further embodiments of the invention, the centre ridgeline may have a concave curvature, or it may be straight. Similarly, the outer surfaces of the pyramidal section may be flat or concave.

The modified arm tips and water trap for the airborne cloud particle measurement probes mitigate the effect of ice particle shattering and droplet splashing on the measurements of cloud particle sizes, shapes and concentrations.

BRIEF DESCRIPTION OF THE DRAWINGS

These and other features of the invention will become more apparent from the following description in which reference is made to the appended drawings wherein.

DETAILED DESCRIPTION

Figure 1:
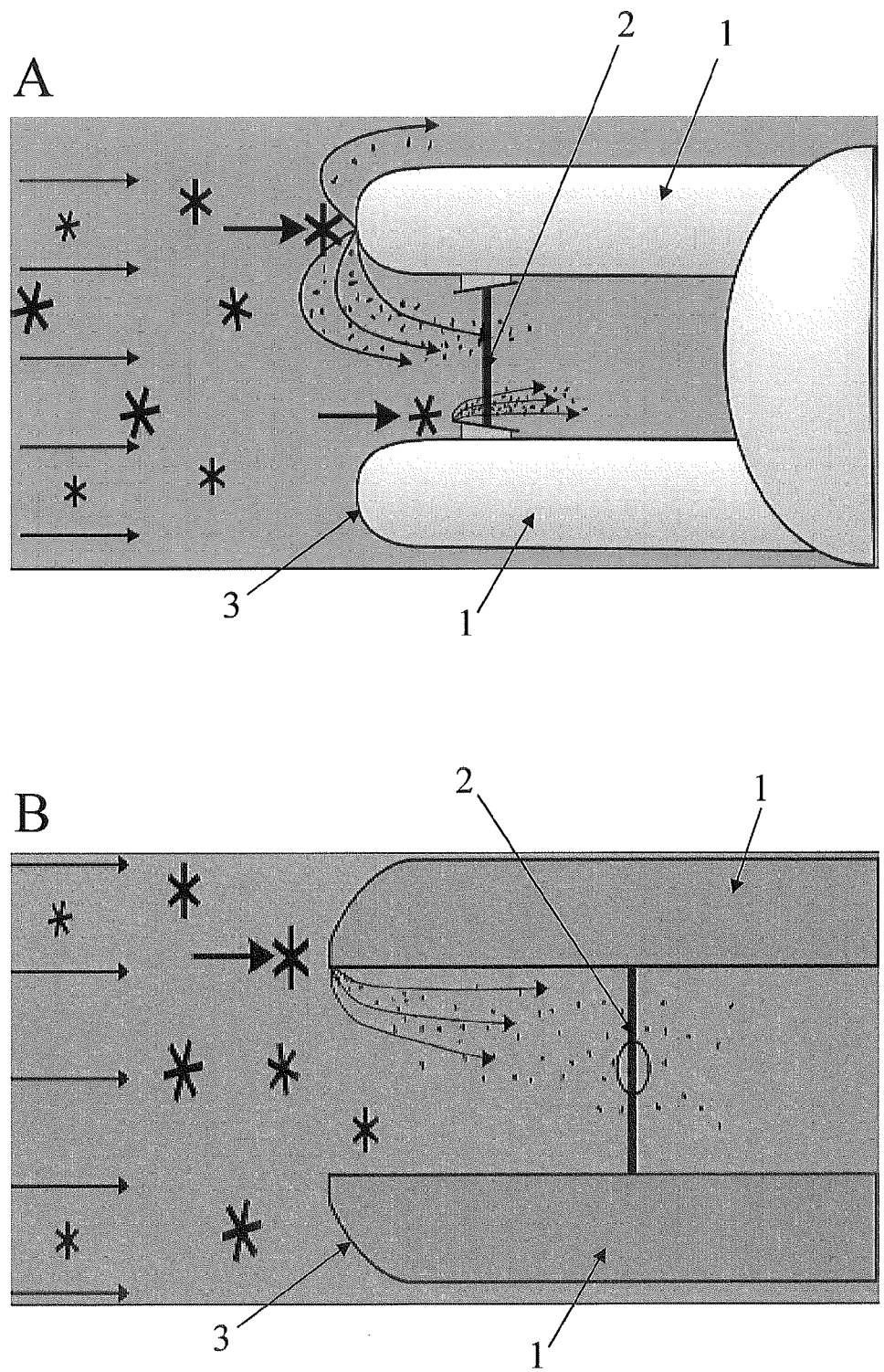
FIG. 1 is a conceptual diagram of the mechanism of particle shattering during sampling by (A) OAP-2DC, OAP-2DP, HVPS, and CIP-type airborne cloud particle instruments, and (B) FSSP, CPI, CAPS and SID-type airborne cloud particle instruments, due to the mechanical impact with probe parts upstream of the sample area.
Figure 2:
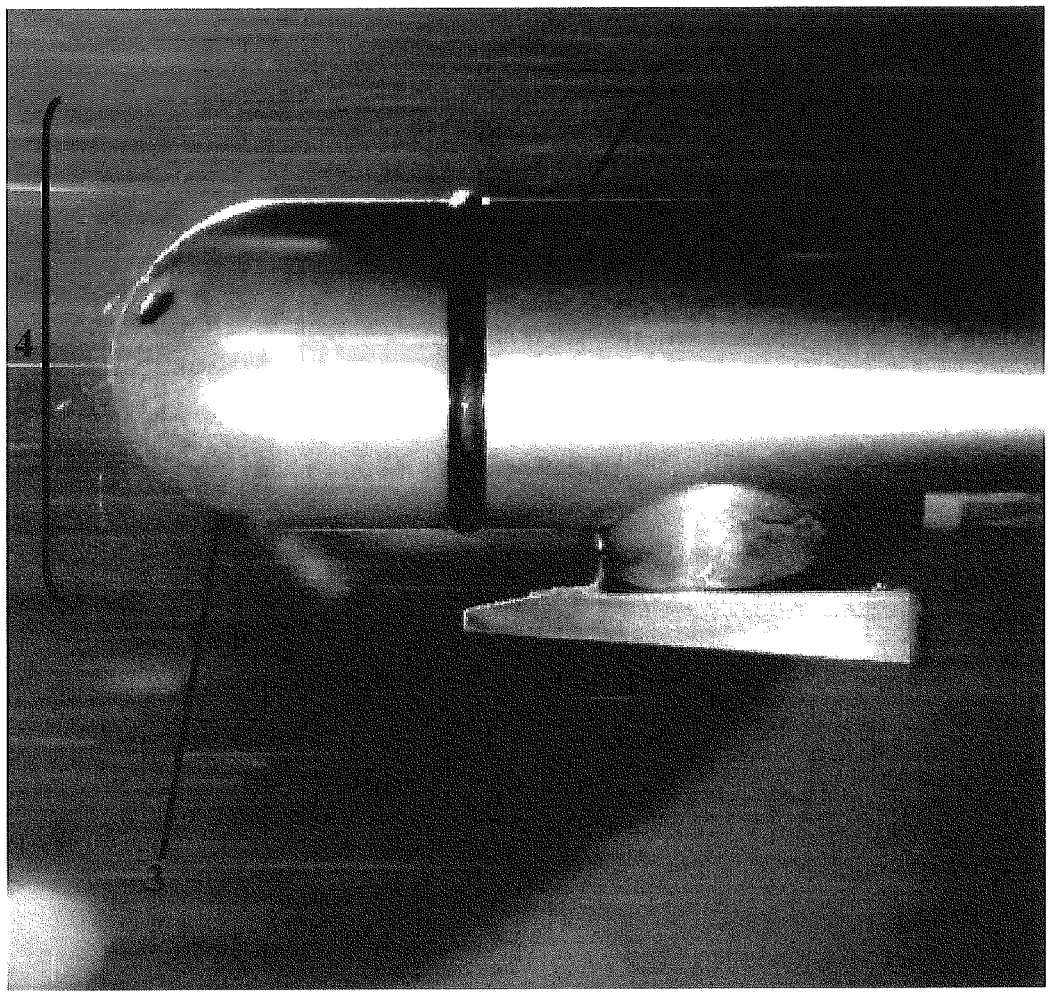
FIG. 2 is a photographical representation of particle shattering caused by mechanical impact with probe parts upstream of the sample area in a OAP-2DC arm during wind tunnel testing (Cox Wind Tunnel, D~2.5 cm, TAS~70 m/s)

High speed video recording of bouncing and shattering of ice particles conducted in wind tunnels has been obtained by NASA in cooperation with Environment Canada confirming that ice particles can shatter and bounce into the sample volume of the particle probes. This is clearly evident in the photograph shown in FIG. 2, where ice particles 4 can be seen bouncing off the semi-spherical probe tip 3 of the probe arm 1 during wind tunnel testing.

Until now, it has been generally believed that the shattered particles could be identified and eliminated during analysis of the cloud particle spectral data, and thus no attempts have been made to redesign the probes' arm tips to mitigate shattering.

The present inventor has modified the probe tips with a view to minimizing the effect of cloud particle shattering. This approach is particularly desirable over the data correction methods currently in use, for instance, since (i) ice particle shattering with standard OAP-2DC arms is thought to result in the overestimation of the measured concentration ten fold or more; and (ii) for some instruments (e.g. OAP-2DC) existing algorithms are incapable of filtering out all shattering events.

The well-known semi-spherical probe tips were replaced with (i) conical and (ii) pyramidal probe tips and tested in wind tunnel experiments to ascertain which design has the greatest effect in reducing the effect of ice shattering on measurements.

Figure 3:
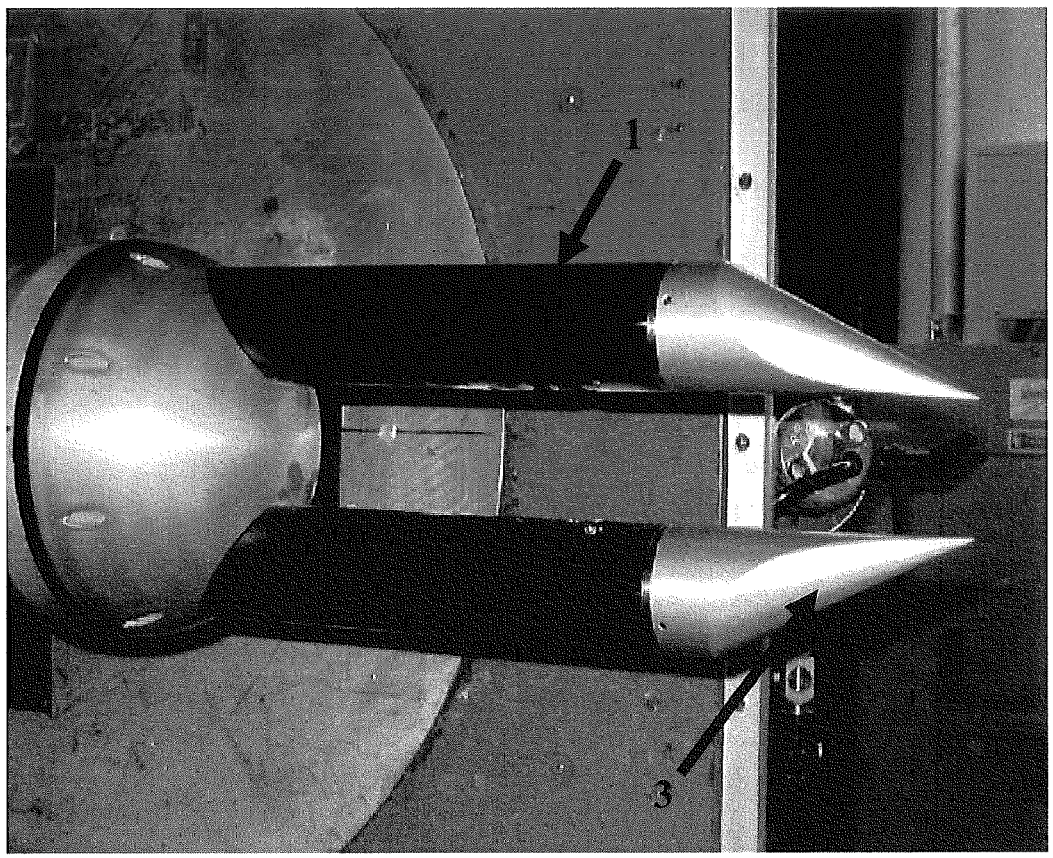
FIG. 3 is a photographical representation of conical FSSP arm tips, the FSSP probe installed inside a wind tunnel compartment.
Figure 4:
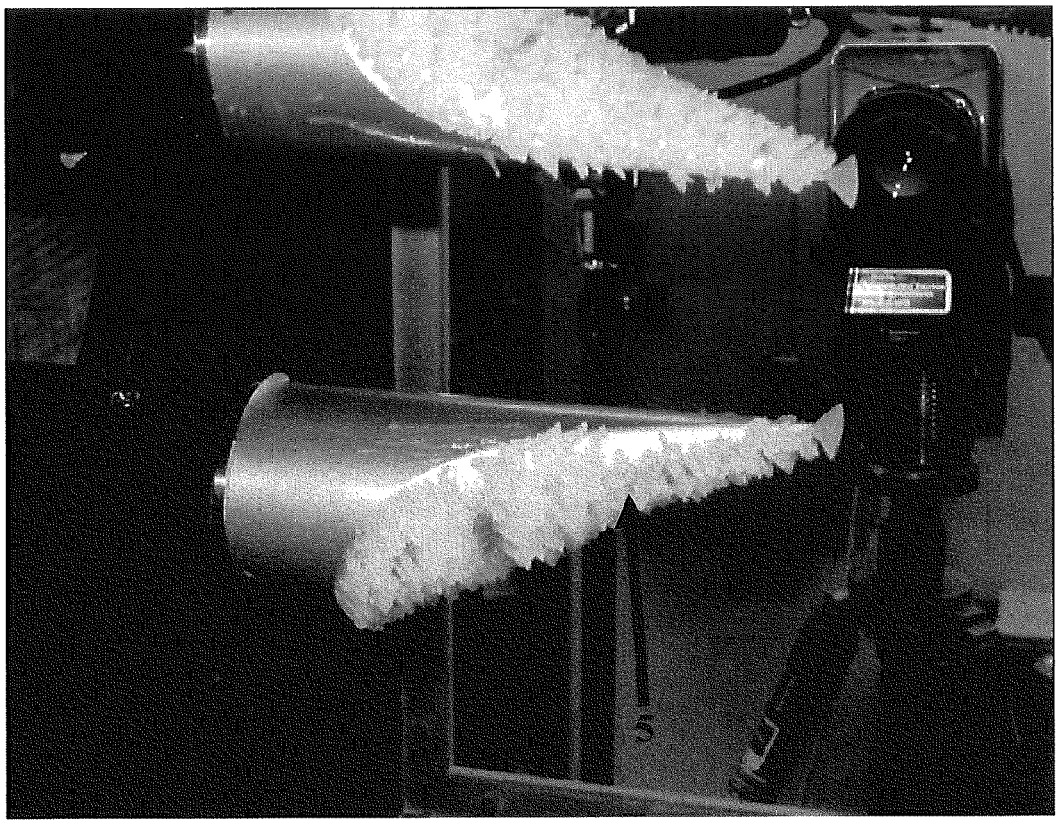
FIG. 4 is a photographical representation of the conical FSSP arm tips shown in FIG. 3 during exposure to high speed supercooled liquid spray, and illustrating the ice build-up on the tip surface exposed to the airflow.
Figure 5:
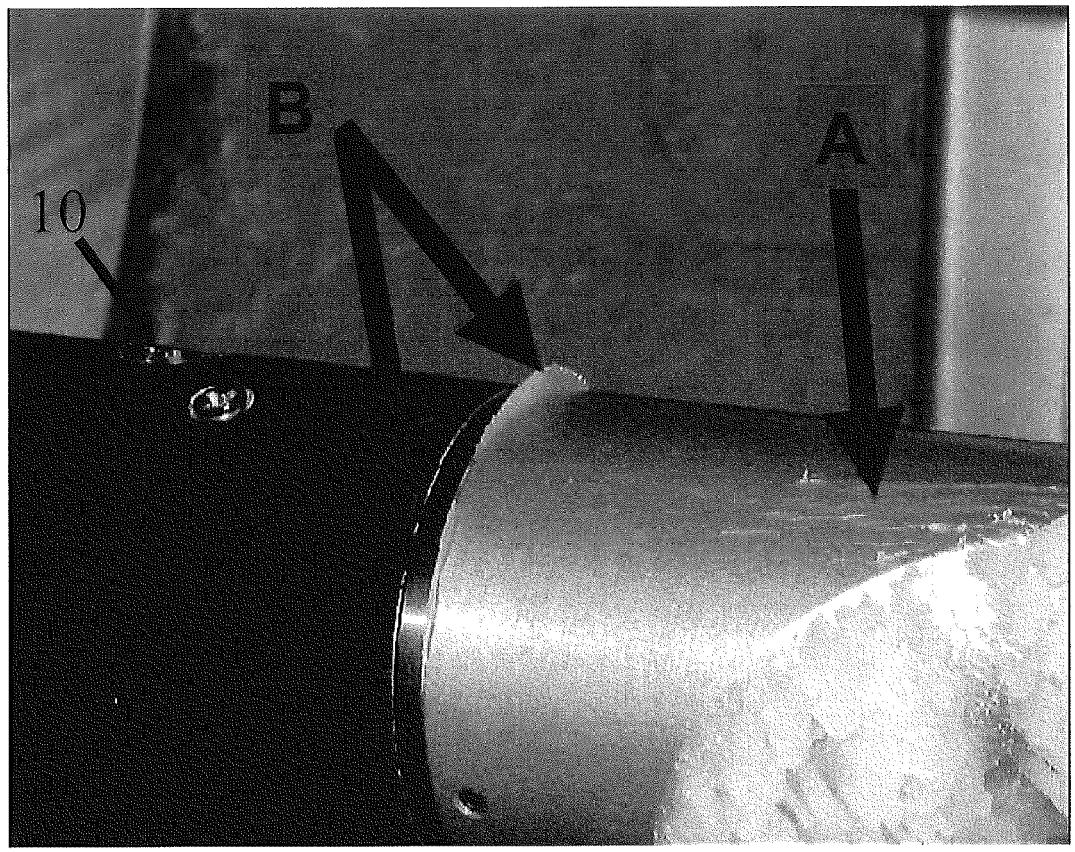
FIG. 5 is a close-up view of the conical FSSP arm tips shown in FIG. 4, showing (A) the streaks of frozen water shed along the inner tip's surface formed when the tip heaters were turned off; and (B) refrozen water on the unheated section of the arm tip in the form of an ice ridge, resulting from the water shed along the inner tip surface.

The configuration of the wind tunnel testing compartment can be seen in FIG. 3, in which a FSSP probe is installed having conical tips 3 on the probe arms 1. When exposed to high-speed supercooled liquid spray within the test environment, ice build-up 5 can be seen on the tip surface exposed to the airflow (FIG. 4). However, as is better seen in the close-up view of the conical FSSP arm tips in FIG. 5, when the tip heaters are turned off streaks of frozen water A can be observed. These are shed along the inner tip's surface and cause a build up of refrozen water on the unheated section of the arm tip in the form of an ice ridge B. The water shed along the inner tip surface may also enter the optical window 10 of the probe arm.

Figure 6:
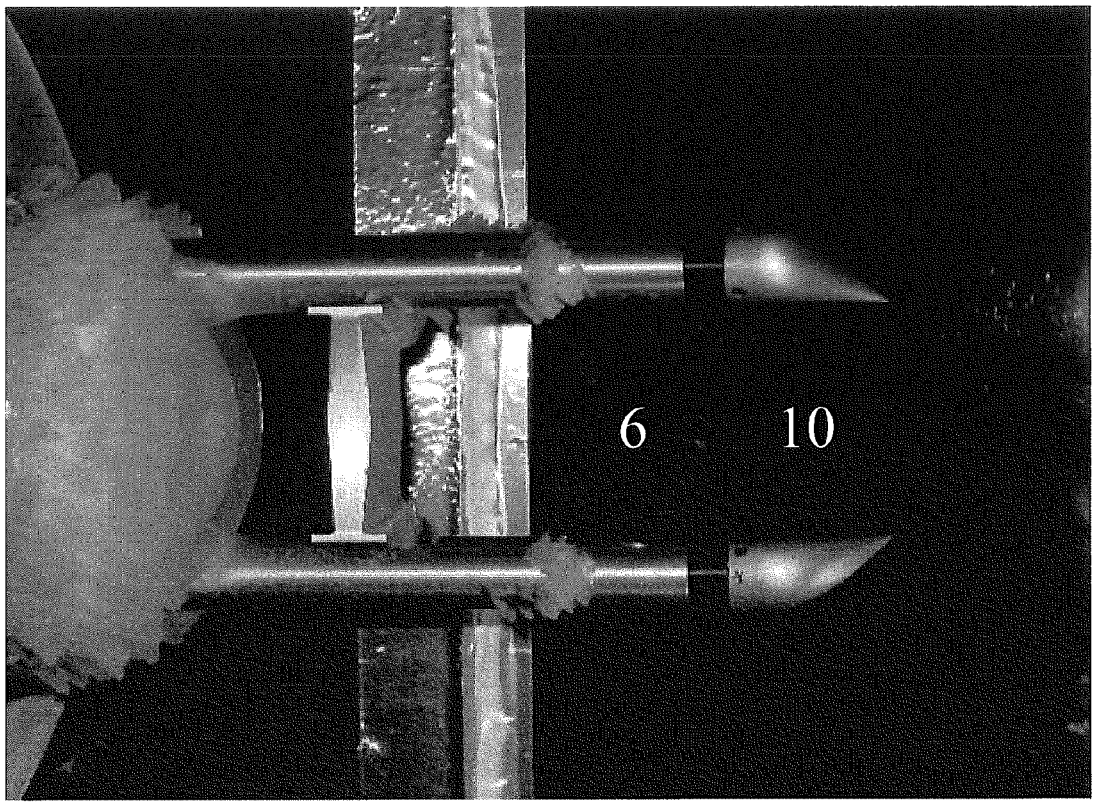
FIG. 6 is a photographical representation of conical OAP-2DC arm tips based on the design published in Korolev et al., J. Atm. Ocean. Techn (2005; supra) during wind tunnel testing (Cox Wind Tunnel, D~2.5 cm, TAS~70 m/s), and showing refrozen water on the unheated section of the arm. The build up of the refrozen water around the whole arm suggests that the water sheds along both inner and outer surface of the arm, and when water sheds along the inner part of the arm surface it may get into the optical window.

Wind tunnel testing was also undertaken using an OAP-2DC probe fitted with conical arm tips. This conical OAP-2DC arm tip design is based on the design published in Korolev et al., J. Atm. Ocean. Techn (2005; supra). As is observed in FIG. 6 and similar to the results obtained using conical FSSP probe tips, refrozen water builds up on the unheated sections of the OAP-2DC arms during wind tunnel tests (Cox Wind Tunnel, D~2.5 cm, TAS~70 m/s). The build up of the refrozen water 6 around the whole arm suggests that the water sheds along both inner and outer surfaces of the arm. Thus, when water sheds along the inner part of the arm surface it may enter the optical window 10 and interfere with the optical measurements of the probe.

Figure 7:
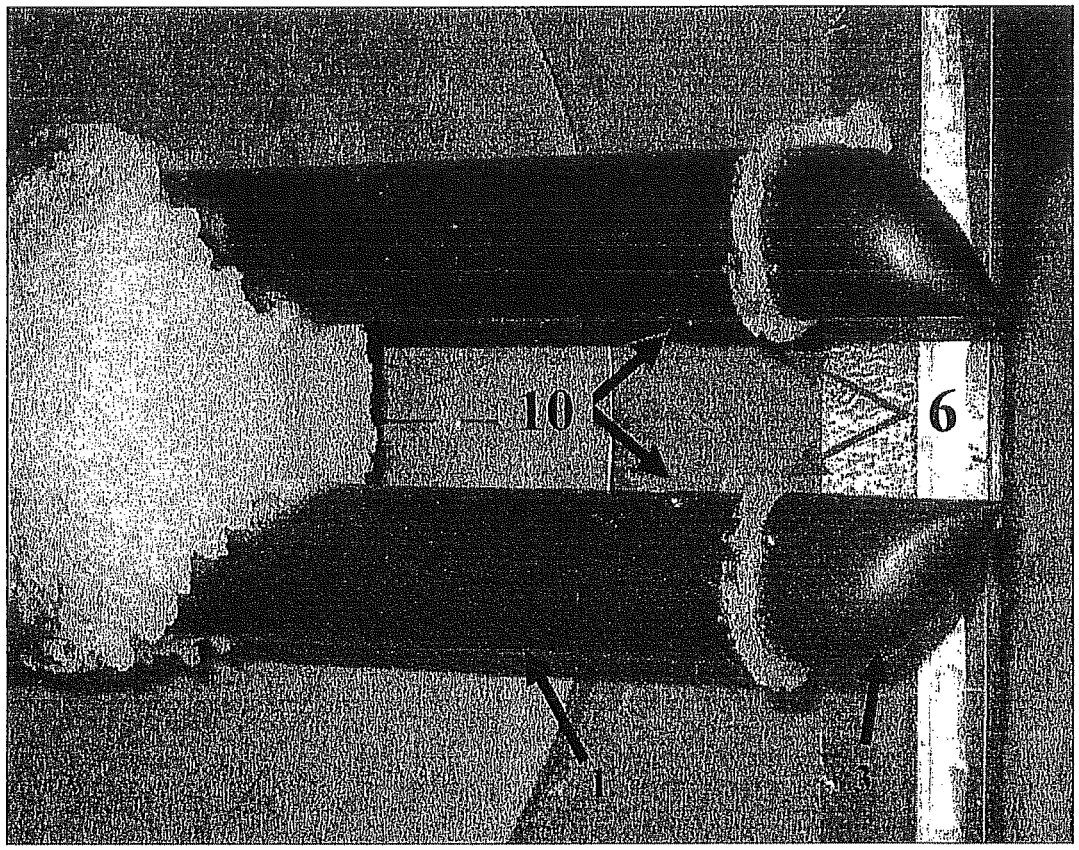
FIG. 7 is a photographical representation of conical FSSP arm tips based on the design published in Korolev et al., J. Atm. Ocean. Techn (2005; supra) installed inside a wind tunnel compartment during wind tunnel testing (Cox Wind Tunnel, D~2.5 cm, TAS~70 m/s) and showing build up of refrozen water around the whole unheated section of the arm, suggesting that the water sheds along both inner and outer surfaces of the arm and that water shed along the inner part of the arm surface may get into the optical window.

For comparative purposes, conical FSSP arm tips based on the design published in Korolev et al., J. Atm. Ocean. Techn (2005; supra) were also tested as described above for the OAP-2DC probe (Cox Wind Tunnel, D~2.5 cm, TAS~70 m/s). Results of the wind tunnel experiments, portrayed in the photograph of FIG. 7, showed refrozen water 6 built up around the whole unheated section of the arm, similarly suggesting that the water sheds along both inner and outer surfaces of the arm and that the water shed along the inner part of the arm surface may get into the optical window 10.

Figure 8:
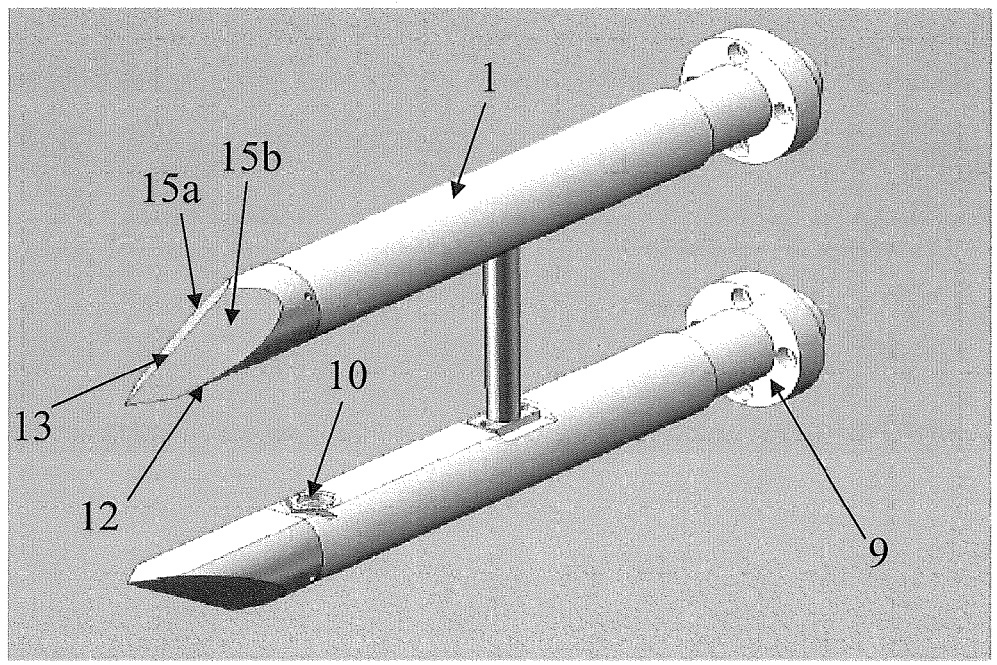
FIG. 8 shows (A) modified pyramidal OAP-2DC arm tips according to an example of one embodiment of the invention, and (B) the arm tips of (A) mounted onto the forward portion of an OAP-2DC measuring probe; the outer part of the tips consisting of either flat or concave surfaces in order to minimize water shedding from the outer part of the tip towards the inner part and to prevent water from getting into the optical windows.
Figure 8:
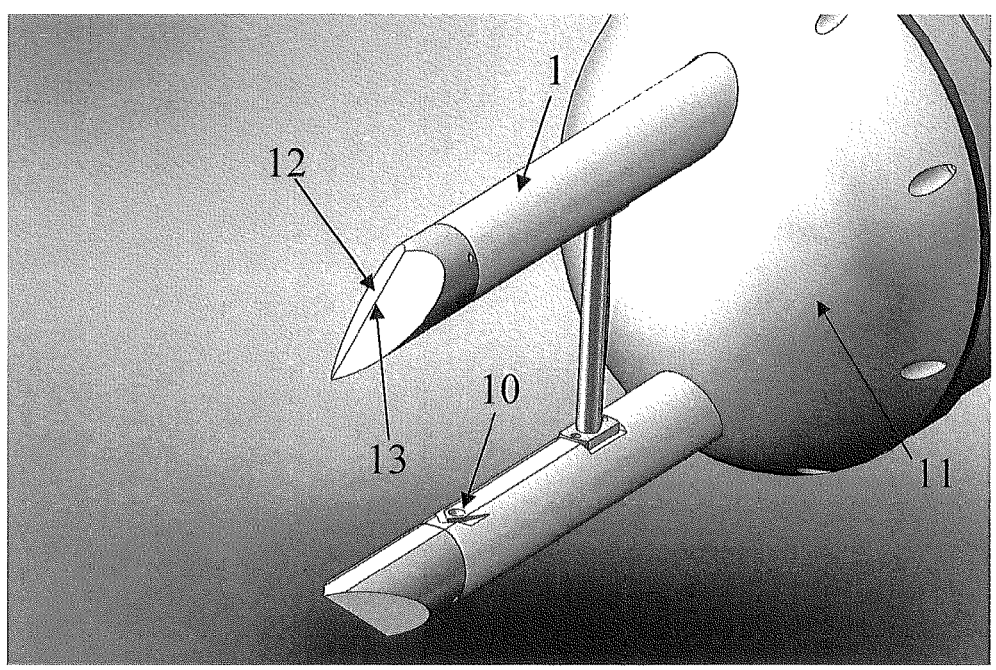

FIG. 8A shows modified pyramidal OAP-2DC arm tips according to an example of one embodiment of the invention. According to the example shown, the tips have an outer pyramidal tip portion 12 designed to deflect water, ice or other cloud particles away from the inner surface of the probe tip. The pyramidal tip portion 12 has a center ridgeline 13 and outer surfaces 15a and 15b. The pyramidal tips can be installed on the arms 1 of an OAP-2DC probe, which are in turn mounted onto the forward portion 11 of the instrument as illustrated in FIG. 8B according to means commonly known in the art, for instance via mounting flanges 9.

Figure 9:
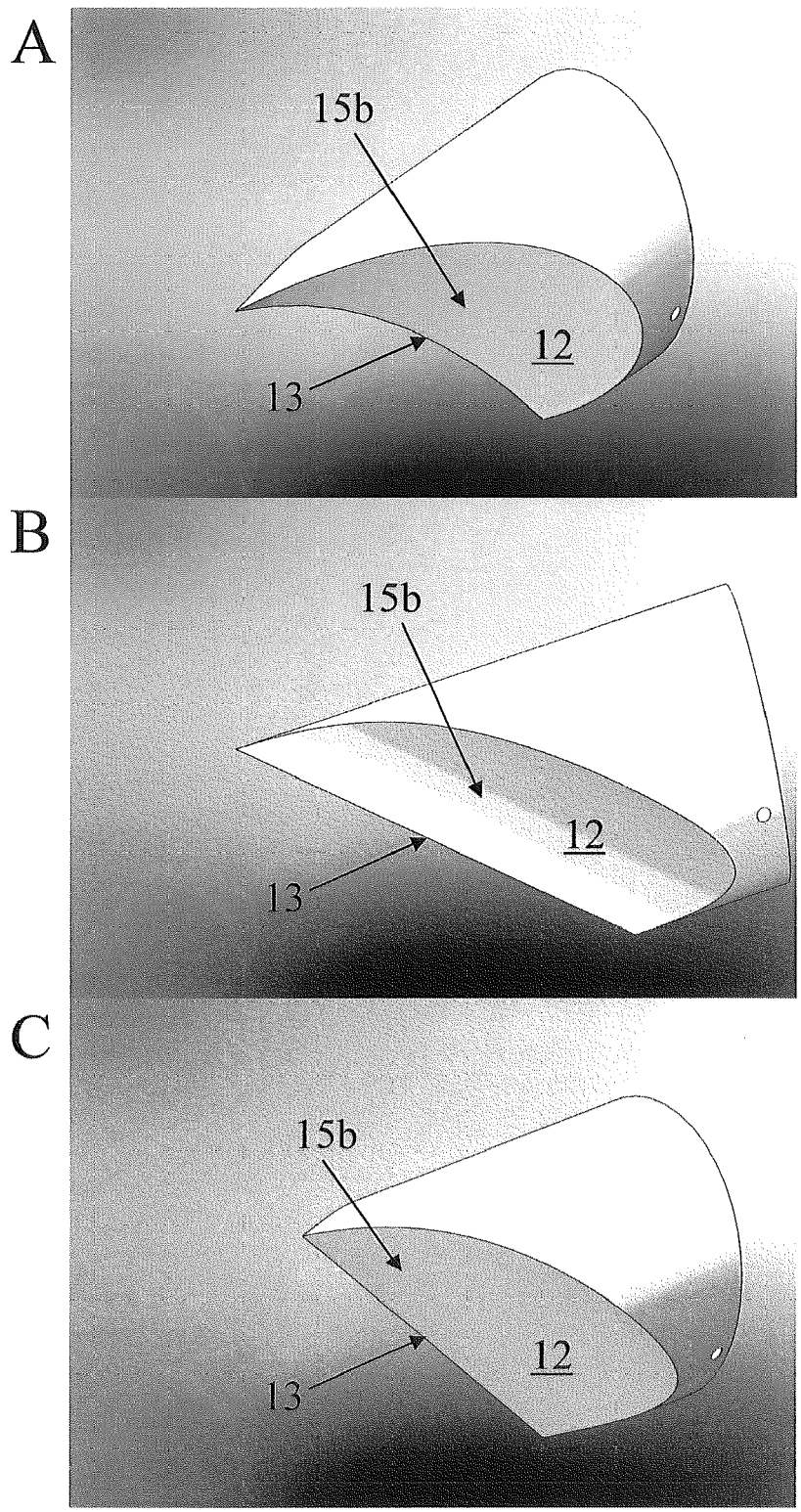
FIG. 9 shows modified pyramidal arm tips according to further examples of an embodiment of the invention, having a curved pyramidal outer tip portion with concave ridgeline (A), a curved pyramidal outer tip portion with straight ridgeline (B), and a flat pyramidal outer tip portion with straight ridgeline (C)

In further exemplary embodiments, as illustrated in FIGS. 9A-B, the outer surfaces 15a and 15b of the probe tips may be concave. Alternatively, the outer surfaces 15a and 15b of the probe tips may be flat as can be seen in FIG. 9C. In addition, the center ridgeline 13 of the probe tips may be concave as illustrated in FIG. 9A, or straight as illustrated in FIGS. 9B and C. In certain embodiments it may be desirable to incorporate concavity into outer surfaces 15a and 15b and/or curvature into the center ridgeline 13 of the outer pyramidal portion 12, to further mitigate the shedding from the outer part of the tip towards the inner part and reduce the shattering effect caused by small water, ice or other cloud particles during operation. However, in other embodiments a straight center ridgeline 13 and flat outer surfaces 15a and 15b of the probe tips may be sufficient for reducing the shattering effect.

Figure 10:
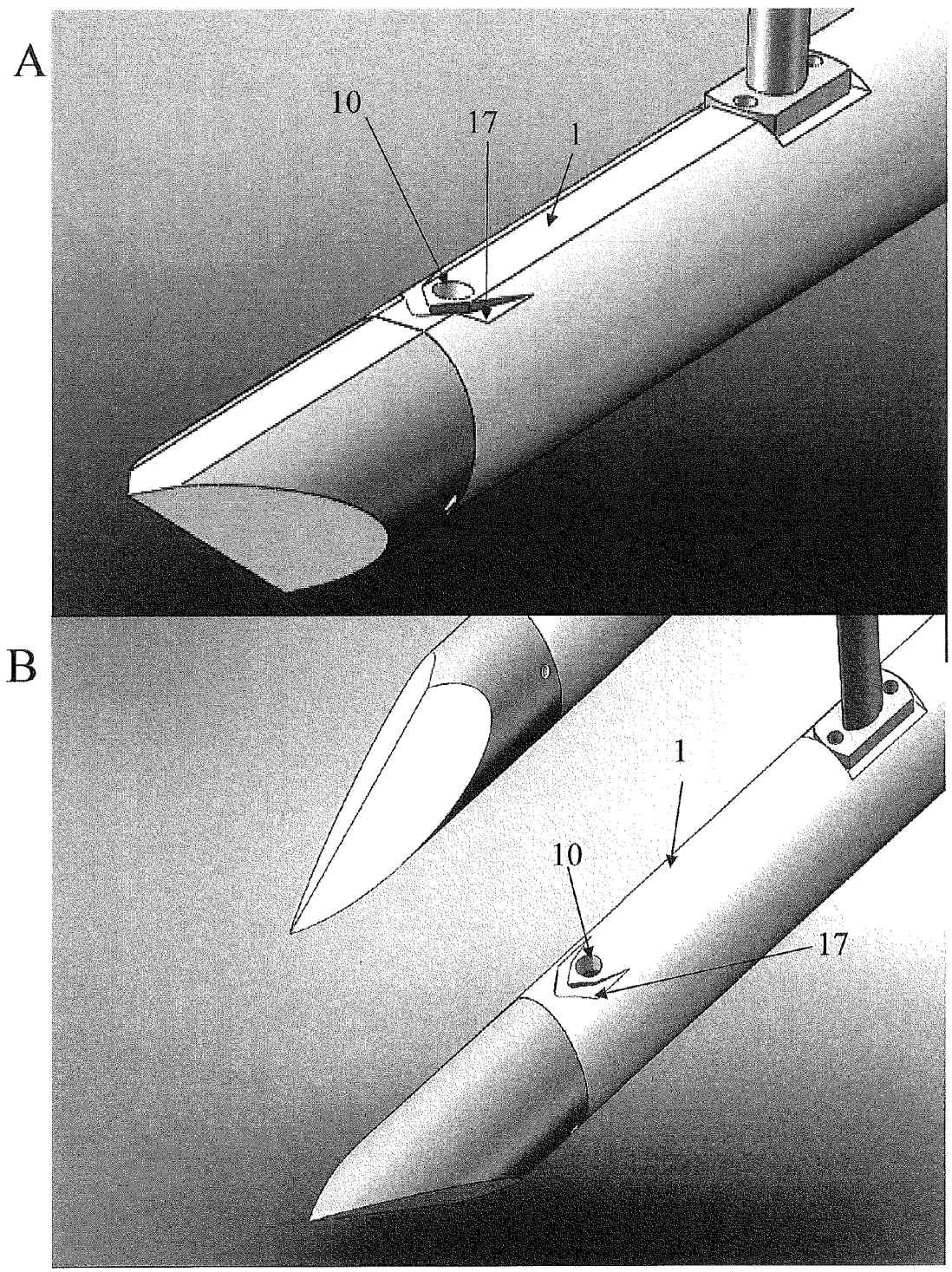
FIG. 10A is an expanded view of the bottom pyramidal OAP-2DC arm tip shown in FIG. 8A; illustrating the optical window of the probe and a water trap for directing water shed along the arm surface away from the optical window.
FIG. 10B is an expanded view of a possible alternate embodiment of the pyramidal OAP-2DC arm tip shown in FIG. 8A.

FIG. 10A depicts the bottom pyramidal OAP-2DC arm tip shown in FIG. 8A in expanded view, in order to better illustrate the optical window 10 of the probe and an optional water trap 17. The water trap 17 may comprise a notch, trough or other formation in the upper surface of the probe arm 1 effective to direct water which is shed along the inner arm surface away from the optical window 10. The water trap 17 may be machined or otherwise formed to the desired depth and dimensions based on the type of cloud particle instrumentation. As depicted, the water trap 17 is machined into the probe arm immediately forward of the optical window. A possible alternate embodiment of the water trap 17 can also be seen in FIG. 10B.

Figure 11:
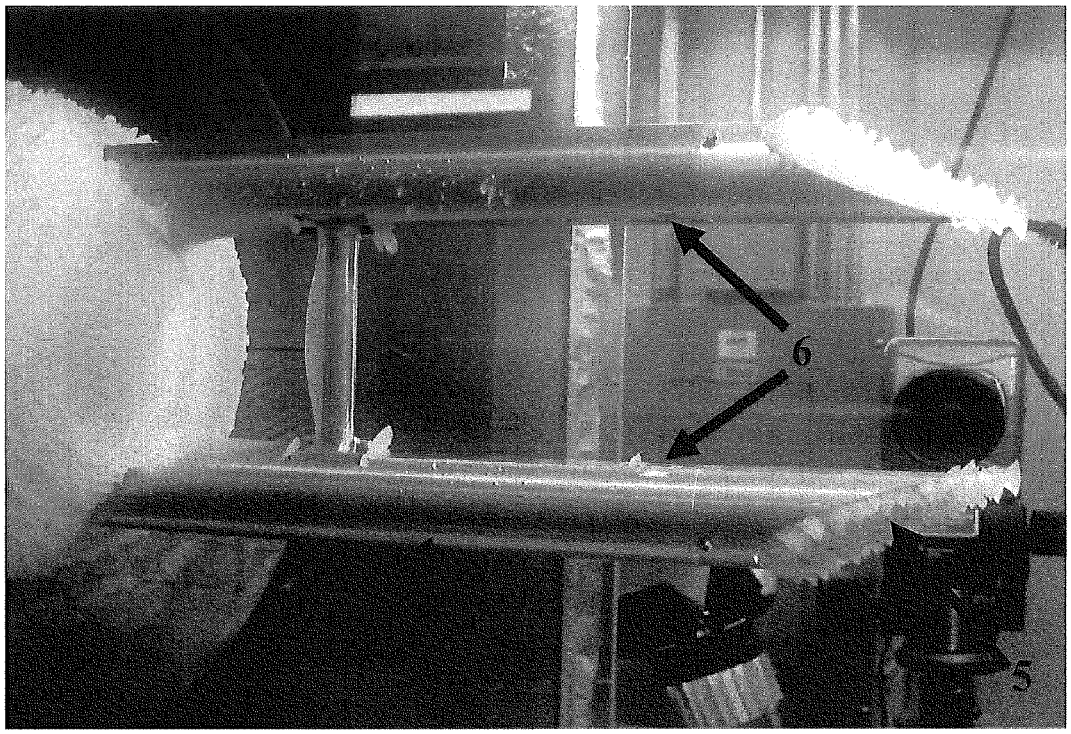
FIG. 11 is a photographical representation of pyramidal OAP-2DC arm tips according to an embodiment of the invention, mounted onto the forward portion of an OAP-2DC measuring probe installed inside a wind tunnel compartment during wind tunnel testing (Cox Wind Tunnel, D~2.5 cm, TAS~70 m/s) and showing minimal build up of refrozen water around the inner part of the arm surface, suggesting significant reduction in the amount of water shed along the inner arm surface and therefore reduced amounts of water getting into the optical window.

Pyramidal arm tips as described above and illustrated in FIGS. 8-10 were mounted onto the forward portion of an OAP-2DC measuring probe installed inside a wind tunnel compartment and tested according to similar wind tunnel testing used for the conical arm tips (Cox Wind Tunnel, D~2.5 cm, TAS~70 m/s). The results of this testing are depicted in FIG. 11, and show that minimal amounts of refrozen water build up around the inner parts of the arm surfaces, suggesting a significant reduction in the amount of water shed along the inner arm surface and therefore reduced amounts of water getting into the optical window. Accordingly, these tests suggest that the effect on cloud particle size distribution measurements by water, ice or other cloud particle shattering on the arms of cloud microphysical instruments can be significantly reduced through the use of pyramidal arm tips as described herein. The pyramidal arm tips are a substantial improvement over the semi-spherical arm tips commonly used in the art, and also represent a marked improvement over the conical tip option as described herein.

Based on the observations made during testing, pyramidal arm tips as described herein reduce the effect of shattering, splashing and bouncing on the measurements of particle shape, size and concentration. Preliminary estimates suggest that concentrations of cloud particles may be changed by up to a factor of twenty, depending on the size of the cloud particles. The suggested solution significantly reduces the effect of the shattering, splashing and bouncing on measurements.

Figure 12:
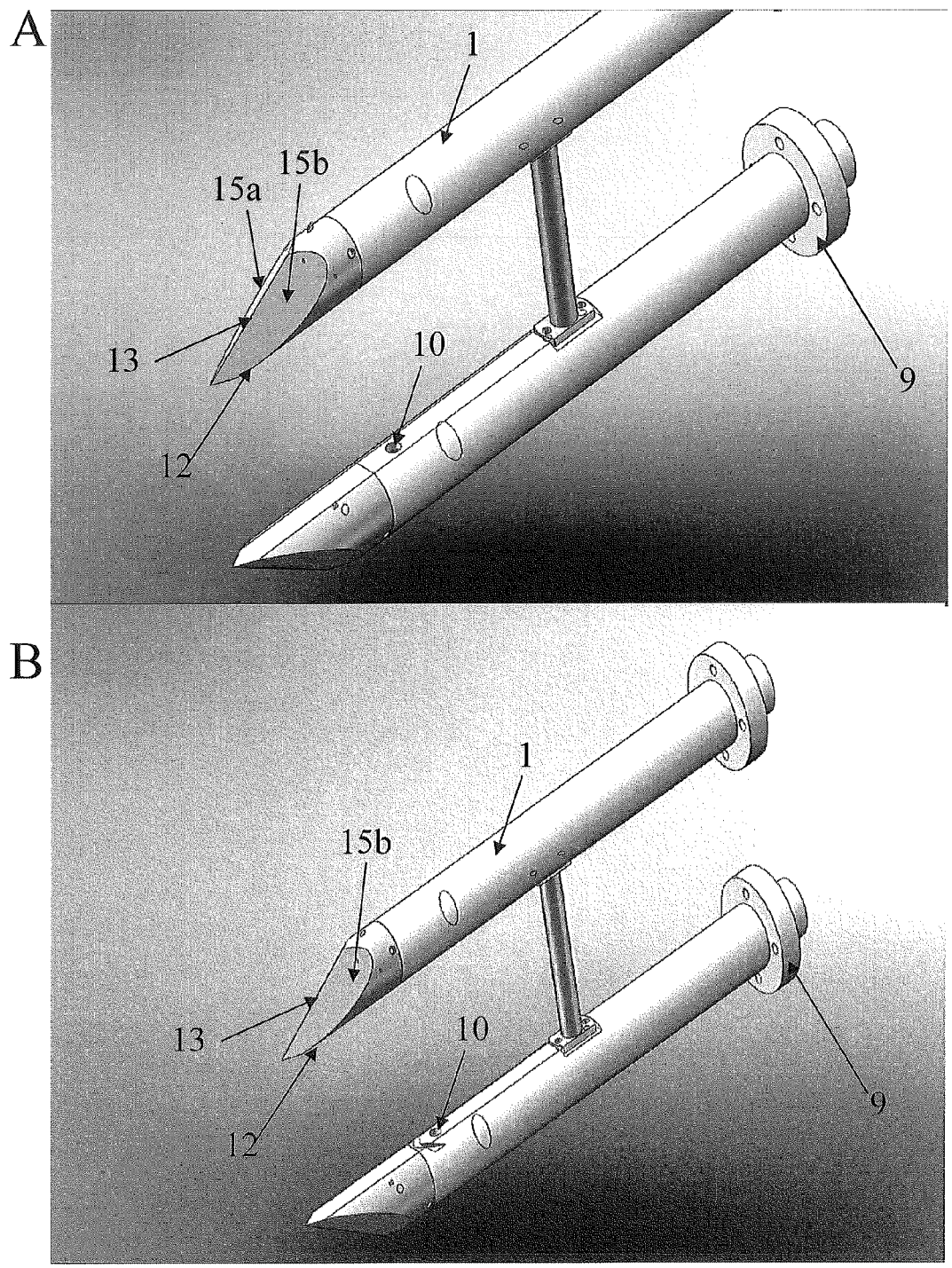
FIGS. 12A and B illustrate modified OAP-2DC arms of additional exemplary embodiments of the invention, each having different arm configurations.
Figure 13:
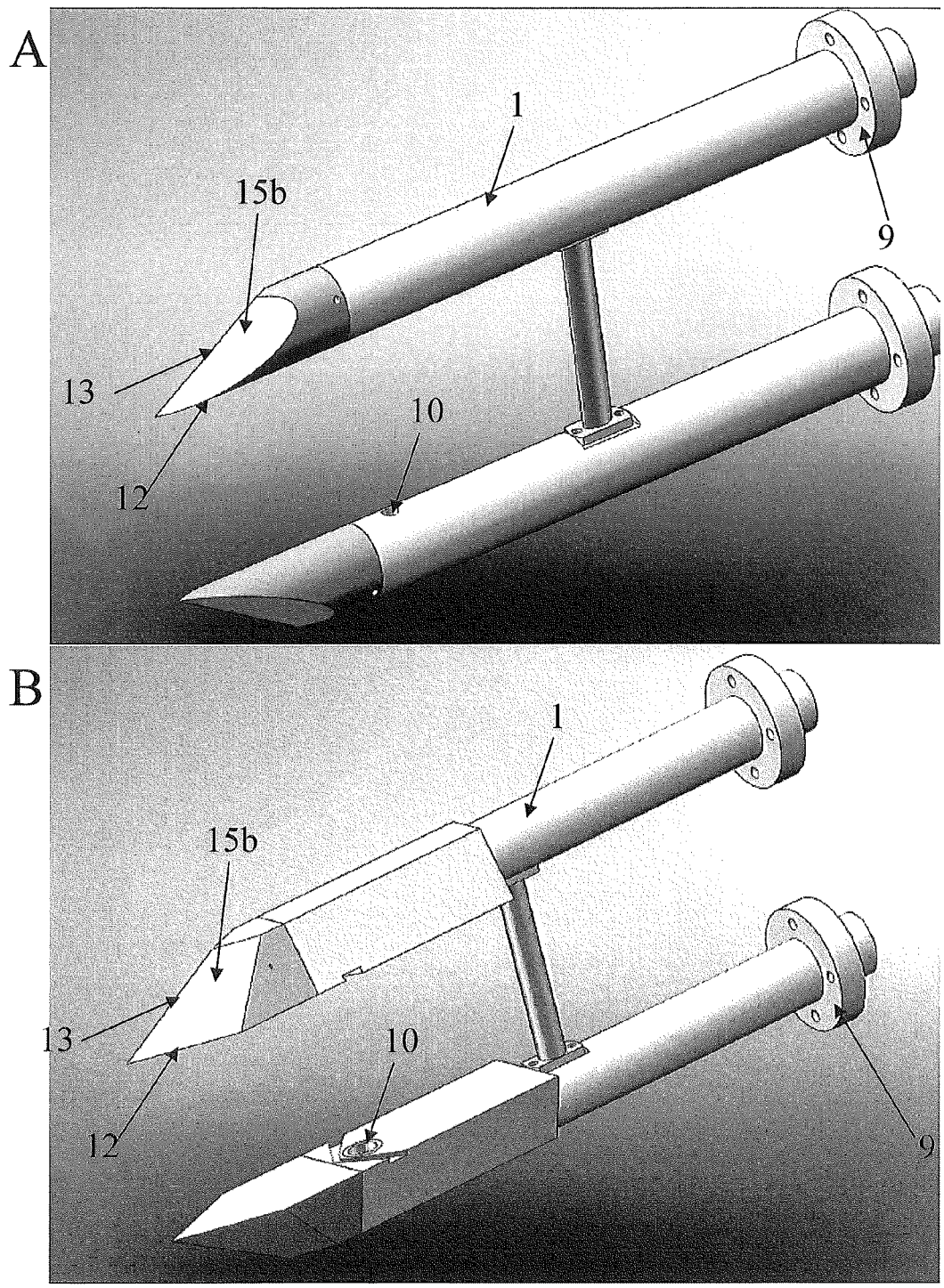
FIGS. 13A and B illustrate modified OAP-2DC arms of further exemplary embodiments of the invention, each having different arm configurations.
Figure 14:
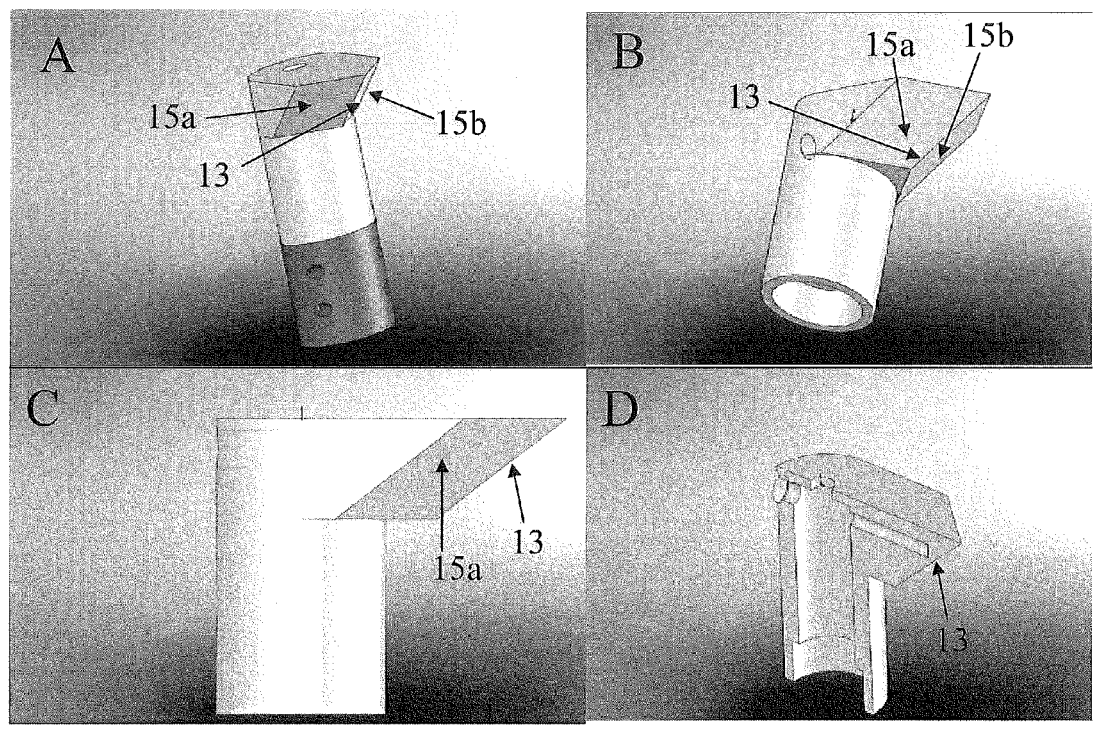
FIGS. 14A-D illustrate modified Cloud Particle Imager (CIP) tip arms of yet further exemplary embodiments of the invention, incorporating a pyramidal CIP arm tip design.

Additional embodiments of the pyramidal probe tips of the invention can be envisioned, for instance as illustrated in FIGS. 12-14. Modified OAP-2DC arms having different arm configurations are seen in FIGS. 12A and B and FIGS. 13A and B, each having pyramidal arm tips with outer surfaces 15a and 15b and a center ridgeline 13. Similarly, modifications to Cloud Particle Imager (CIP) tip arms can be envisioned, such as that illustrated in FIGS. 14A-D whereby pyramidal arm tips with outer surfaces 15a and 15b and a center ridgeline 13 are incorporated into the CIP tip design. Similar modifications may be made to incorporate pyramidal probe tips into other similar airborne cloud particle instruments, for instance OAP-2DP,HVPS, FSSP, CIP, CAPS and SID-type airborne cloud particle instruments.

One or more currently preferred embodiments have been described by way of example. It will be apparent to persons skilled in the art that a number of variations and modifications can be made without departing from the scope of the invention as defined in the claims.

What is claimed is:

1. An instrument for obtaining airborne measurements of cloud microphysical parameters, said instrument comprising:
   supporting arms mounted on the instrument and housing optics and a detector for measuring said cloud microphysical parameters, the supporting arms defining an optical path of the instrument; and tips affixed to the supporting arms comprising an outer portion for deflecting particles away from the optical path of the instrument and an inner portion opposite the outer portion, the outer portion of the tips comprising a pyramidal section having a centre ridgeline and flat or concave surfaces effective to reduce water shedding from the outer portion of the tip towards the inner portion.

2. The instrument according to claim 1, wherein the optics are laser-based optics.

3. The instrument according to claim 1, wherein the instrument is an airborne cloud particle instrument selected from OAP-2DC, OAP-2DP, HVPS, CIP, FSSP, CPI, CAPS and SID-type instruments.

4. The instrument according to claim 1, wherein the supporting arms each comprise an optical window through which light from the optics of the instrument passes along said optical path.

5. The instrument according to claim 4, wherein the supporting arms further comprise a water trap to prevent water shed along the arm surface from entering the optical window.

6. The instrument according to claim 5, wherein the water trap comprises a narrow groove forward of the optical window that expands towards its edges to channel the shedding water away from the optical window.

7. The instrument according to claim 1, wherein the centre ridgeline of the outer portion has a concave curvature.

8. The instrument according to claim 1, wherein the centre ridgeline of the outer portion is straight.

9. The instrument according to claim 1, wherein the outer surfaces of the pyramidal section are flat.

10. The instrument according to claim 1, wherein the outer surfaces of the pyramidal section are concave.

11. A probe tip for airborne instruments used to measure cloud microphysical parameters, the probe tip having an outer portion for deflecting particles away from an optical path of the instrument, and an inner portion opposite the outer portion, the outer portion of the tip comprising a pyramidal section having a centre ridgeline and flat or concave surfaces effective to reduce water shedding from the outer portion of the tip towards the inner portion.

12. The probe tip according to claim 11, wherein the centre ridgeline of the outer portion has a concave curvature.

13. The probe tip according to claim 11, wherein the centre ridgeline of the outer portion is straight.

14. The probe tip according to claim 11, wherein the outer surfaces of the pyramidal section are flat.

15. The probe tip according to claim 11, wherein the outer surfaces of the pyramidal section are concave.

16. The probe tip according to claim 11, adapted for attachment to a supporting arm of an airborne cloud particle instrument selected from OAP-2DC, OAP-2DP, HVPS, CIP, FSSP, CPI, CAPS and SID-type instruments.

17. A method of reducing particle shattering during collection of airborne measurements of cloud microphysical parameters, said method comprising:
providing an airborne cloud particle measuring instrument comprising supporting arms mounted onto the instrument and housing optics and a detector for measuring said cloud microphysical parameters, the supporting arms defining an optical path of the instrument;
providing tips for the supporting arms comprising an outer portion for deflecting particles away from the optical path of the instrument and an inner portion opposite the outer portion, the outer portion of the tips comprising a pyramidal section having a centre ridgeline and flat or concave surfaces effective to reduce water shedding from the outer portion of the tip towards the inner portion; and
collecting measurements in flight of cloud microphysical parameters using said airborne cloud particle measuring instrument, wherein the particle shattering observed in the collected measurements is reduced.

18. The method according to claim 17, wherein the centre ridgeline of the outer portion has a concave curvature or is straight.

19. The method according to claim 17, wherein the airborne cloud particle measuring instrument is selected from OAP-2DC, OAP-2DP, HVPS, CIP, FSSP, CPI, CAPS and SID-type instruments.

20. The method according to claim 17, wherein the supporting arms each comprise an optical window through which light from the optics of the instrument passes along said optical path, and a water trap to prevent water shed along the arm surface from entering the optical window.

* * * * *